Dec. 5, 1961 E. E. LEGATE 3,011,240
POLISH ROD CLAMP
Filed May 4, 1959 2 Sheets-Sheet 1

INVENTOR
ELZIE E. LEGATE

BY *Jacobi & Jacobi*

ATTORNEYS

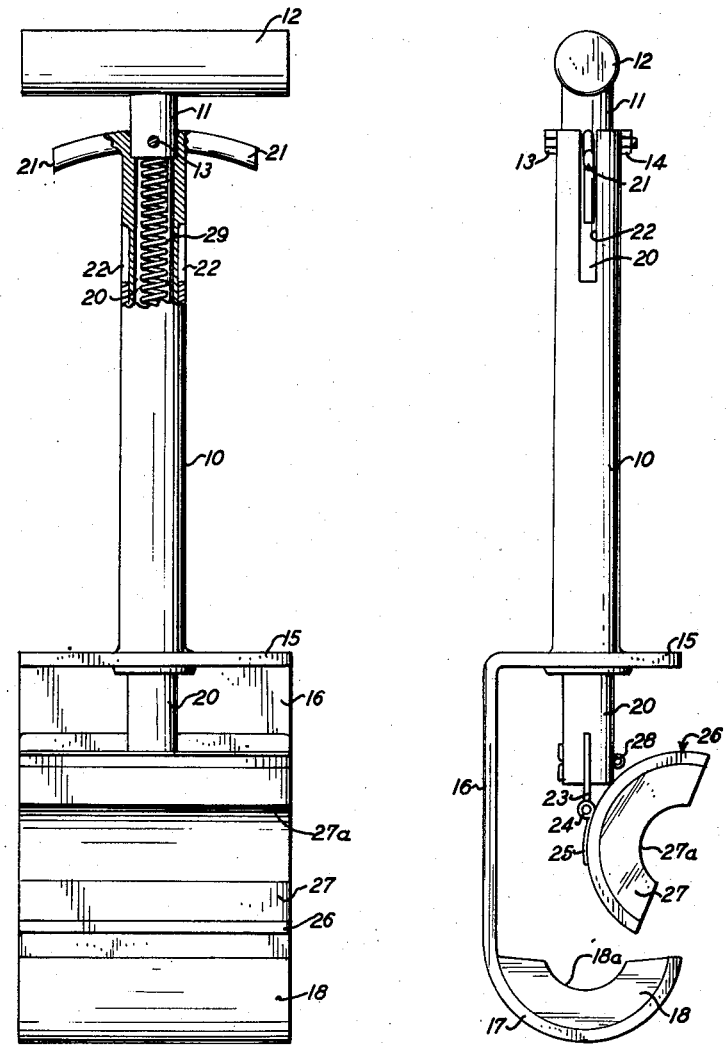

United States Patent Office 3,011,240
Patented Dec. 5, 1961

3,011,240
POLISH ROD CLAMP
Elzie E. Legate, 862 W. 124th St., Los Angeles, Calif.
Filed May 4, 1959, Ser. No. 810,912
1 Claim. (Cl. 24—263)

This invention relates to a polish rod clamp, and has as its primary object the provision of an improved readily attachable and detachable clamp.

An additional object of the invention is the provision of a polish rod clamp particularly adapted for securing to a polish rod to hold objects, such, for example, as a stuffing rod box cover in position on the rod out of the way of workmen engaged in repacking the stuffing box, for example.

Still another object of the invention is the provision of such a rod clamp of diversified utility and resiliently but firmly and securely clampingly engaging a pipe or rod or other cylindrical object for any desired purpose.

A more particular object of the invention is the provision of such a clamp having a fixed jaw and a movable jaw, the jaws normally having opposed faces in clamped position, but the movable jaw being swingable about an axis parallel to the axis of the pipe to be clamped to a position at an angle of ninety degrees relative to the face of the fixed jaw whereby to facilitate clamping of the pipe.

Still other objects reside in the combinations of elements, arrangements of parts and details of construction.

Other objects will in part be obvious, and in part be pointed out in the accompanying drawings wherein, FIGURE 1 is a front elevational view partially broken away of one form of clamp embodying features of this inventive concept, certain concealed parts thereof being shown in dotted lines, in closed or pipe or rod clamping position.

FIG. 3 is a view similar to FIG. 1 but showing the clamp in open position and,

FIG. 4 is a side view of the device in the position shown in FIG. 3.

Similar reference characters refer to similar parts throughout the several views of the drawings.

Figure 1:
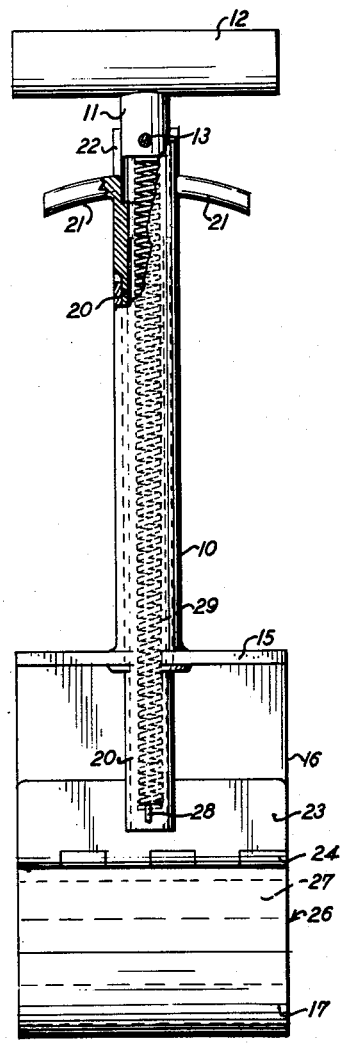

Having reference now to the drawings in detail, the device of the instant invention comprises an outer sleeve 10, the top of which is open and has positioned therein the stem 11 of a T-shaped handle member 12, the handle being secured in position by means of a bolt 13 and nut 14. The lower portion of tubular member 10 has fixedly secured thereto a plate 15, which includes an elongated portion 16 at right angles to plate 15 and parallel to tubular member 10. The portion 16 terminates in an arcuate jaw portion 17, of generally semicircular configuration, which contains a resilient thick liner 18, of neoprene or the like, which comprises a fixed jaw element. Telescopically mounted in the tubular member 10 is an inner sleeve 20 which is provided at its upper end with laterally extending arcuate members 21, which extend laterally through oppositely disposed slots 22 at the upper extremity of tubular member 10. The lower end of inner sleeve 20 extends outwardly through the open bottom of tubular member 10 and has secured thereto one leaf 23 of a hinge 24, the other leaf of which, 25, is fixed to metallic movable jaw member 26 of arcuate configuration corresponding to the jaw member 17 and which contains an inner semicircular resilient lining 27 also comprised of neoprene or the like. The two opposed jaws 18 and 27 are provided with opposed cutaway portions 18a and 27a which are adapted for the gripping of a pipe P when the device is in closed position, as indicated in FIG. 1.

Figure 2:
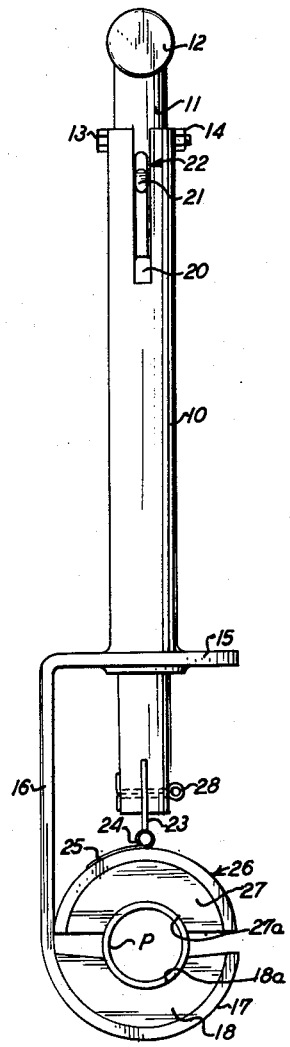
FIG. 2 is a side elevational view of the device as shown in FIG. 1.

A cotter pin 28 extended through the lower end of sleeve 20 has secured thereto one end of a compression spring 29, the other end of which is secured to the pin 13, the arrangement being such that the spring normally biases the movable jaw 27 to clamping position as shown in FIGS. 1 and 2.

When it is desired to open the jaws, the handle 12 is grasped in the palm of the hand and the fingers engaged about the trigger members 21. A squeezing action will cause the withdrawal of the sleeve 20 upwardly in the tube 10 causing the parts to assume the position of FIGS. 3 and 4, with the movable jaw 27 swinging outwardly about the pivot 24 of the hinge member to facilitate the reception of a polish rod or pipe or the like therein. Obviously this arrangement permits almost instantaneous application of the clamp to a polish rod by simply slapping the device on the pipe which automatically swings the movable hinge 27 into alignment with its opposed hinge 18, whereupon release of the trigger 21 will permit the spring 29 to bias the movable jaw into relatively tight clamping engagement with the object to be grasped thereby.

From the foregoing it will now be seen that there is herein provided a device which accomplishes all of the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

A polish rod clamp comprising an elongated tubular member, and offset portion secured to one end of said tubular member and terminating in an integral arcuate fixed jaw, a relatively thick yieldable liner on said jaw, said liner having an elongated arcuate recess, the axis of said recess being spaced from an parallel to the plane of said offset portion and in alignment with the axis of said tubular member, a sleeve slidably received in said tubular member and projecting from said one end, a movable jaw pivotally mounted on the projecting end of said sleeve, the axis of said pivot being parallel to the axis of said arcuate recess and at right angles to the axis of said tubular member, a relatively thick yieldable liner on said movable jaw, said last named liner having an elongated arcuate recess, a transverse handle member secured to the opposite end of said tubular member, said tubular member having opposed longitudinal slots therein adjacent said opposite end, laterally extending trigger members secured to said sleeve and extending outwardly through said slots and spring means in said sleeve biasing said sleeve and movable jaw toward said fixed jaw, said movable jaw being movable from a work clamping position with said recesses in opposed alignment to a work receiving position with said movable jaw moved about said pivot away from said offset portion through an arc of approximately ninety degrees.

References Cited in the file of this patent

UNITED STATES PATENTS

| | | |
|---|---|---|
| 211,357 | Turner | Jan. 14, 1879 |
| 342,827 | Evans | June 1, 1886 |
| 486,726 | Mendelson | Nov. 22, 1892 |
| 554,545 | Shaffer | Feb. 11, 1896 |
| 919,731 | LaMay | Apr. 27, 1909 |
| 1,523,415 | Goldberg | Jan. 20, 1925 |
| 1,764,071 | Foulke | June 4, 1930 |
| 2,093,658 | Hildenbrand | Sept. 21, 1937 |
| 2,584,282 | Nelson | Feb. 5, 1952 |
| 2,632,935 | Coleman | Mar. 31, 1953 |
| 2,682,694 | Hempkes | July 6, 1954 |
| 2,757,962 | MacLeod | Aug. 7, 1956 |

FOREIGN PATENTS

| | | |
|---|---|---|
| 193,034 | Switzerland | Dec. 1, 1937 |